(12) United States Patent
Mundt et al.

(10) Patent No.: US 6,459,546 B1
(45) Date of Patent: Oct. 1, 2002

(54) ALTITUDE INSENSITIVE DISC HEAD SLIDER

(75) Inventors: Michael D. Mundt, Longmont, CO (US); James R. Krolnik, Burnsville, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/353,854

(22) Filed: Jul. 15, 1999

Related U.S. Application Data

(60) Provisional application No. 60/093,749, filed on Jul. 21, 1998.

(51) Int. Cl.$^7$ .................................................. G11B 5/60
(52) U.S. Cl. ..................................................... 360/236.3
(58) Field of Search .............................. 360/236, 236.3, 360/237, 235.5

(56) References Cited

U.S. PATENT DOCUMENTS

| | | | |
|---|---|---|---|
| 4,646,180 A | 2/1987 | Ohtsubo | 360/103 |
| 4,670,806 A | 6/1987 | Ghose | 360/103 |
| 5,128,822 A | 7/1992 | Chapin et al. | 360/103 |
| 5,200,868 A | * 4/1993 | Chapin et al. | 360/103 |
| 5,267,109 A | 11/1993 | Chapin et al. | 360/103 |
| 5,343,343 A | 8/1994 | Chapin | 360/103 |
| 5,404,256 A | 4/1995 | White | 360/103 |
| 5,424,888 A | 6/1995 | Hendriks et al. | 360/103 |
| 5,490,026 A | 2/1996 | Doruis et al. | 360/103 |
| 5,508,862 A | 4/1996 | Lazzari et al. | 360/103 |

FOREIGN PATENT DOCUMENTS

| | | |
|---|---|---|
| JP | 61-160885 | 7/1986 |
| JP | 61-170922 | 1/1989 |
| JP | 1-211383 | 8/1989 |
| JP | 2-132688 | 5/1990 |
| JP | 3-132981 | 6/1991 |

OTHER PUBLICATIONS

Q.H. Zeng and D.B. Bogy, "Slider Air Bearing Designs for Load/Unload Applications", IEEE Trans. Magn., vol. 35 No. 2, Mar. 1999, pp. 746–751.

* cited by examiner

*Primary Examiner*—George J. Letscher
(74) *Attorney, Agent, or Firm*—Westman, Champlin & Kelly

(57) ABSTRACT

A self-loading disc head slider includes a slider body with leading and trailing slider edges, first and second side edges, and a length along a slider center line, from the leading slider edge to the trailing slider edge. First and second raised rails are positioned on the slider body, generally along the first and second side edges, respectively, and terminate prior to the trailing slider edge. The first and second raised rails form first and second bearing surfaces. A raised center pad is positioned along the trailing slider edge at the slider center line and forms a third bearing surface. A cavity dam is positioned rearward of the first and second raised rails and has a forward section, which is positioned forward of the raised center pad, and first and second leg sections, which extend rearward from the forward section on respective sides of the raised center pad. A subambient pressure cavity trails the cavity dam and extends on respective sides of the raised center pad.

16 Claims, 5 Drawing Sheets

ALTITUDE INSENSITIVE DISC HEAD SLIDER

CROSS-REFERENCE TO RELATED APPLICATION

This application claims the benefit of U.S. Provisional Patent Application No. 60/093,749, which was filed on Jul. 21, 1998 and entitled "ALTITUDE INSENSITIVE AIR BEARING FOR MAGNETIC HEAD-MEDIA SEPARATION."

BACKGROUND OF THE INVENTION

The present invention relates to disc drive data storage systems and, more particularly, to a disc drive data storage system having a slider which has a flying height that is relatively insensitive to changes in altitude.

Disc drives of the "Winchester" type are well known in the industry. Such drives use rigid discs which are coated with a magnetizable medium for storage of digital information in a plurality of circular, concentric data tracks. The discs are mounted on a spindle motor which causes the discs to spin and the surfaces of the discs to pass under respective hydrodynamic (e.g. air) bearing disc head sliders. The sliders carry transducers which write information to and read information from the disc surfaces.

An actuator mechanism moves the sliders from track-to-track across the surfaces of the discs under control of electronic circuitry. The actuator mechanism includes a track accessing arm and a suspension for each head gimbal assembly. The suspension includes a load beam and a gimbal. The load beam provides a load force which forces the slider toward the disc surface. The gimbal is positioned between the slider and the load beam, or is integrated in the load beam, to provide a resilient connection that allows the slider to pitch and roll while following the topography of the disc.

The slider includes an air bearing surface which faces the disc surface. As the disc rotates, the disc drags air under the slider and along the air bearing surface in a direction approximately parallel to the tangential velocity of the disc. As the air passes beneath the air bearing surface, air compression along the air flow path causes the air pressure between the disc and the air bearing surface to increase which creates a hydrodynamic lifting force that counteracts the load force and causes the slider to lift and fly above or in close proximity to the disc surface.

One type of slider is a "self-loading" air slider, which includes a leading taper, a pair of raised side rails, a cavity dam and a subambient pressure cavity. The leading taper is lapped onto the end of the slider that is opposite to the recording head. The leading taper pressurizes the air as the air is dragged under the slider by the disc surface. The cavity dam provides an expansion path for the air to de-pressurize as it is dragged into the sub-ambient pressure cavity by the disc velocity. The expanded air in the cavity provides a self-loading force which forces the slider toward the disc surface. The counteraction between positive pressure developed along the side rails, the preload force provided by the suspension and the self-loading force provides the air bearing with a high vertical stiffness.

The physical separation between the slider and the disc surface at the recording head is an important parameter to disc drive performance. It is desired to minimize variation in the head clearance or "flying height" as the data storage device is operated at different altitudes above sea level. Such variation in flying height normally occurs in state-of-the-art air bearings as a result of changes in ambient pressure.

It is well known that conventional sliders demonstrate flying height sensitivity to ambient pressure. Specifically, flying height is inversely proportional to operating altitude. Flying height sensitivity to ambient pressure poses severe problems for sliders that are designed to operate at very low flying heights (approximately 1 microinch), since a 20% drop in ambient pressure greatly increases the probability of contact between the slider and the disc surface.

This behavior forces disc drive designers to meet minimum flying height requirements at the highest specified altitude, which is typically 10,000 feet above sea level. As a result, the sliders are designed to fly with an undesirably large head-media spacing at altitudes where the disc drive is most frequently used, i.e., near sea level. Such a design compromise reduces the maximum useable linear density of the storage media and thus the storage capacity of the disc drive.

Improved sliders are desired which have a small flying height sensitivity to variations in ambient pressure.

SUMMARY OF THE INVENTION

One aspect of the present invention relates to a self-loading disc head slider having a slider body with leading and trailing slider edges, first and second side edges, and a length along a slider center line, from the leading slider edge to the trailing slider edge. First and second raised rails are positioned on the slider body, generally along the first and second side edges, respectively, and terminate prior to the trailing slider edge. The first and second raised rails form first and second bearing surfaces. A raised center pad is positioned along the trailing slider edge at the slider center line and forms a third bearing surface. A cavity dam is positioned rearward of the first and second raised rails and has a forward section, which is positioned forward of the raised center pad, and first and second leg sections, which extend rearward from the forward section on respective sides of the raised center pad. A subambient pressure cavity trails the cavity dam and extends on respective sides of the raised center pad.

Another aspect of the present invention relates to a self-loading disc head slider, which includes a slider body with leading and trailing slider edges and first and second side edges. First and second raised rails are positioned on the slider body, generally along the first and second side edges, respectively, and terminate prior to the trailing slider edge. A first cavity dam extends along the leading slider edge, between the first and second raised rails. A first subambient pressure cavity trails the first cavity dam, between the first and second raised rails. A second cavity dam is positioned rearward of the first and second raised rails. Third and fourth raised rails extends rearward from the second cavity dam, generally along the first and second side edges, respectively. A second subambient pressure cavity trails the second cavity dam. A raised center pad is positioned along the trailing slider edge.

Yet another aspect of the present invention relates to a disc drive assembly having a data storage disc, which is rotatable about an axis, and a slider for supporting a transducer at a flying height above the data storage disc during rotation of the data storage disc about the axis. The flying height is relatively insensitive to changes in altitude.

DETAILED DESCRIPTION OF THE PREFERRED EMBODIMENTS

Figure 1:
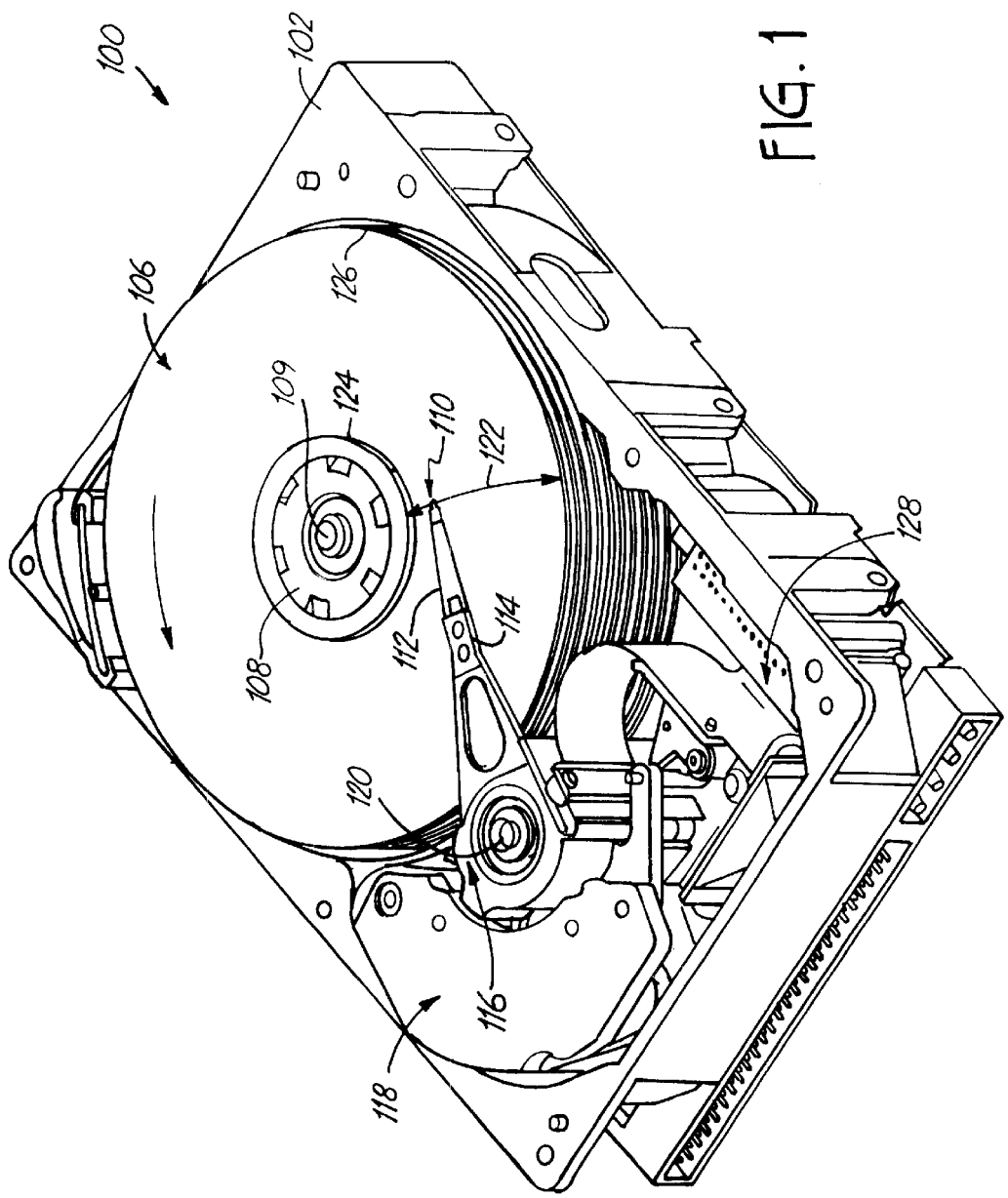
FIG. 1 is a perspective view of a disc drive in which the slider of the present invention can be used.

FIG. 1 is a perspective view of a disc drive 100 in which the present invention is useful. The same reference numerals are used in the various figures to represent the same or similar elements. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs which are mounted for co-rotation about central axis 109. Each disc surface has an associated slider 110 which is mounted to disc drive 100 and carries a read/write head for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached sliders 110 about a pivot shaft 120 to position sliders 110 over a desired data track along a path 122 between a disc inner diameter 124 and a disc outer diameter 126. Voice coil motor operates under control of internal circuitry 128. Other types of actuators can also be used, such as linear actuators.

As discussed in more detail below, slider 110 has a hydrodynamic (e.g. air) bearing that maintains a substantially constant separation between the read/write head and the surface of the disc despite changes in ambient pressure at altitudes between sea level and 10,000 feet above sea level. This allows the target flying height to be set more efficiently for flying conditions at sea level, and also reduces the possibility of head crashes at high operating altitudes. Slider 110 achieves this result by locating a subambient pressure cavity near the trailing edge of the air bearing, rather than near the center of the air bearing.

As a result, the pitch torque generated by subambient pressure within the subambient pressure cavity nearly cancels any flying height drop caused by a reduction in pressure along the positive pressure regions of the bearing.

Figure 2:
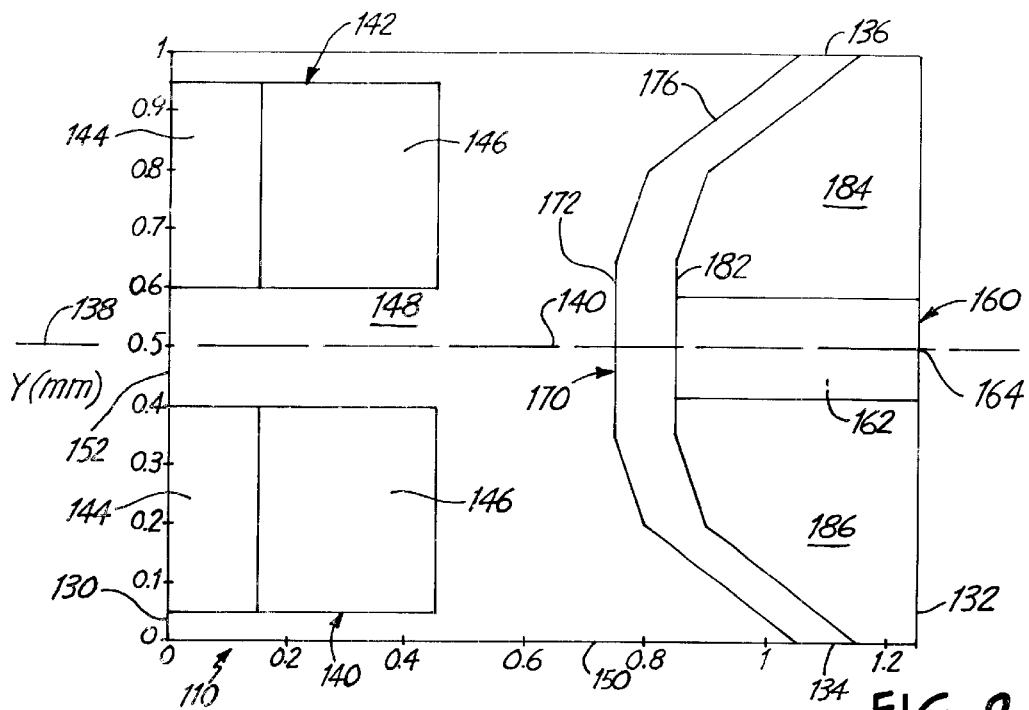
FIG. 2 is a bottom plan view of a slider in the disc drive shown in FIG. 1, according to one embodiment of the present invention.

FIG. 2 is a bottom, plan view of slider 110 as viewed from the disc surface, according to one embodiment of the present invention. Slider 110 has a leading slider edge 130, a trailing slider edge 132, slider side edges 134 and 136, a longitudinal center line 138 and a center of mass 139. Center of mass 139 is located approximately at the geometric center of slider 110. An X-axis 150 and a Y-axis 152 are superimposed on FIG. 2 along side edge 134 and leading edge 136, respectively, of slider 110 to illustrate the length and width of slider 110 and its various geometric features. In the embodiment shown in FIG. 2, slider 110 has a length along X-axis 150 of 1.25 mm and a width along Y-axis 152 of 1.0 mm. Slider 110 has a longitudinal midpoint at 0.625 mm. This slider size is often referred to as a "picoslider" size.

Raised side rails 140 and 142 are positioned near leading slider edge 130 and extend toward trailing slider edge 132, along side edges 134 and 136, respectively. Rails 140 and 142 terminate prior to center of mass 190 and trailing slider edge 132. Each rail 140 and 142 had a leading step surface 144 and a bearing surface 146. Leading step surfaces 144 are raised from slider body surface 148 and are recessed from and generally parallel to bearing surfaces 146. In one embodiment, leading step surfaces 144 are recessed from bearing surfaces 146 by 0.3 microns, but can have other step depths such as 0.05 microns to 1.5 microns, for example. In an alternative embodiment, leading step surfaces 144 are replaced with traditional leading taper surfaces, which can be formed with a grinding or lapping process.

Slider 110 further includes a raised trailing center pad 160 positioned near trailing slider edge 132, at longitudinal center line 138. Center pad 160 has a bearing surface 162 which is generally coplanar with bearing surfaces 146 of rails 140 and 142. However, it should be understood that slider 110 can have a certain amount of crown and cross curvature as is well known in the art. Center pad 160 supports a read/write transducer 164 along trailing edge 132. Read/write transducer 164 can include various types of transducers, such as magnetic, magnetoresistive and optical transducers, for example. Other transducer types can also be used, and the transducer can be positioned at various locations on slider 110.

Slider 110 further includes a raised cavity dam 170, which is positioned rearward of rails 140 and 142 and rearward of slider center of mass 139. Cavity dam 170 has a forward section 172, which is positioned forward of center pad 160 and has first and second leg sections 174 and 176, which extend rearward from forward section 172 on respective sides of center pad 160. Leg sections 174 and 176 intersect side edges 134 and 136, respectively, and terminate prior to trailing slider edge 132.

Cavity dam 170 has a generally U-shape, which at least partially envelopes center pad 160. Cavity dam 170 is recessed from bearing surfaces 146 and 162 by a step depth of 0.05 microns to 1.5 microns. The recess assists in pressurizing bearing surface 162 of center pad 160.

In the embodiment shown in FIG. 2, center pad 160 extends from a trailing edge 182 of forward section 172 to trailing slider edge 132. This defines a subambient pressure cavity 180 which trails cavity dam 170 and has first and second cavity portions 184 and 186 on respective sides of center pad 160. Subambient pressure cavity 180 and slider body surface 148 have depths measured from bearing surfaces 146 and 162 of 1.0 microns to 4.5 microns in one embodiment of the present invention. Other depths can also be used, and the depths can vary along the surface of slider 110 in alternative embodiments.

In the embodiment shown in FIG. 2, subambient pressure cavity 180 is located entirely rearward of center of mass 139. As discussed in more detail below, subambient pressure cavity 180 is adapted to define a centroid of subambient pressure at a location between 0.68 and 0.76 times the length of slider 110, as measured along longitudinal center line 138. The location of the centroid of subambient pressure is determined in part by the depth of subambient pressure cavity 180 and the location of cavity dam 170.

Since subambient pressure cavity 180 is positioned rearward of center of mass 139, subambient pressure generated within subambient pressure cavity 180 provides a pitch torque on slider 110 that nearly cancels a flying height drop due to changes in pressure along positive pressure bearing surfaces 146 and 162 with changes in altitude.

The decrease in flying height sensitivity to changes in altitude (and hence ambient pressure) was verified with a simplified model of air bearing dynamics. The simplified model invoked a spring analogy. A slider was modeled with a positive pressure region at each of the four corners of the slider. The positive pressure between the slider and the disc surface was modeled as a simple spring, wherein the positive pressure at a particular point on the slider surface was defined as being inversely proportional to the slider flying height at that point. This relationship can be expressed as $p=C_1/h$, where p is pressure, $C_1$ is a constant and h is the slider flying height. The subambient pressure region was also parameterized as a simple spring, but in this case $p=C_2 \exp\{-h/h_0\}$, where p is pressure, $C_2$ and $h_0$ are constants, and h is the slider flying height. The dependence of the flying height "h" on the pressure along the positive and subambient pressure regions were derived from full numerical simulations. The constants $C_1$ and $C_2$ were obtained with data from the numerical simulations.

In a steady state, the slider must be in equilibrium. Therefore, the following standard force and moment balance equations are applicable:

$\Sigma F_Z=0$    Eq. 1

$\Sigma M_Y=0$    Eq. 2

$\Sigma M_X=0$    Eq. 3 where the Y and X subscripts denote pitch and roll axes, respectively, the Z subscript denotes a vertical direction normal to the disc surface, F denotes a force balance and M denotes a moment balance. After parameterizing the positive and subambient pressure regions as discussed above, algebraic manipulation yielded a system of three equations for three unknowns: the height of the slider center of mass, the pitch angle and the roll angle.

Figure 3:
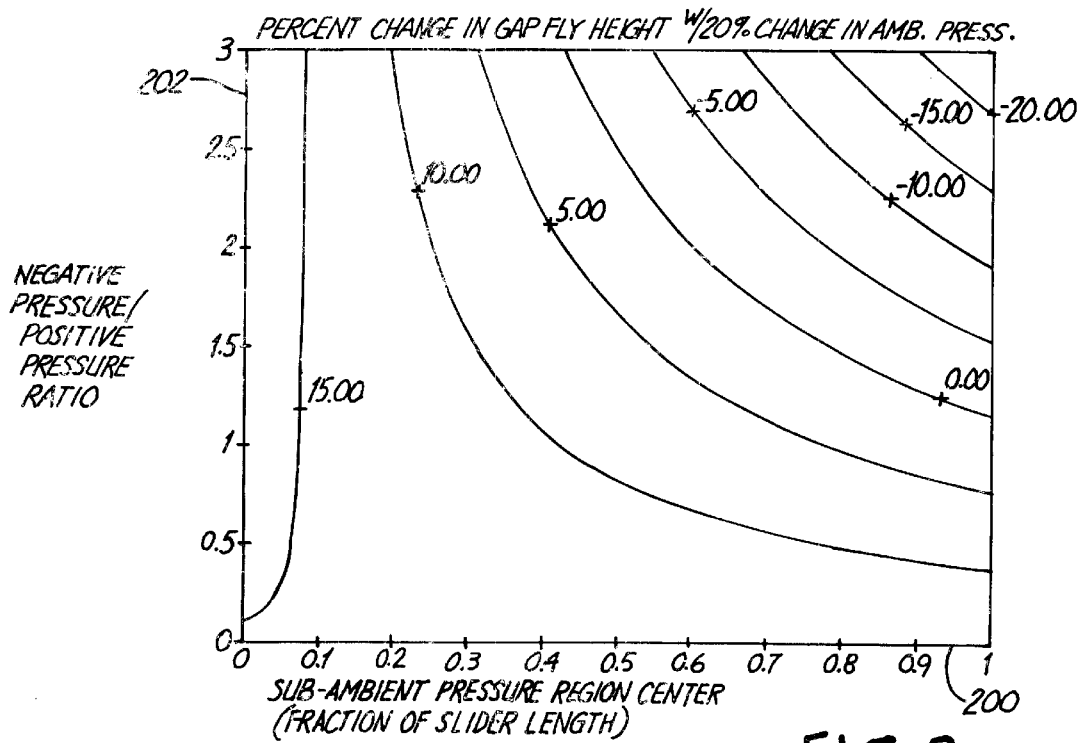
FIG. 3 is a graph illustrating fractional change in flying height with a change in ambient pressure as it relates to location of the subambient pressure region center and the normalized magnitude of suction force.

Next, a Monte Carlo simulation was performed by randomly changing the size and location of the subambient pressure cavity, and the percentage change in flying height due to a given change in ambient pressure for a particular slider configuration was observed. The results of the simulation are shown in the graph of FIG. 3. In FIG. 3, X-axis 200 represents the location of the subambient pressure region center as a fraction of the slider length, with 0.5 denoting the middle of the slider. Y-axis 202 represents the ratio of subambient integrated pressure to positive integrated pressure on the slider surface. Each line in FIG. 3 represents the percentage change in flying height for a selected flying height (h) with a 20% change in ambient pressure.

FIG. 3 shows that the flying height drop with a 20% drop in ambient pressure becomes smaller (and can actually become negative resulting in a flying height gain) as the subambient pressure area is moved toward the trailing slider edge. According to the spring model, the flying height is about 2.5 times less sensitive to changes in ambient pressure when a large subambient pressure area is located rearward on the slider body the when located forward on the slider body. The rearward location of the subambient pressure region causes the pitch and roll angles of the slider to decrease when the ambient pressure is reduced, thereby reducing the change in flying height at the read/write transducer gap. FIG. 3 also reveals that when the subambient pressure center is located forward on the slider body, the percentage drop in flying height is independent of the amount of subambient pressure This supports an observation that although higher suction in a given design generally means better altitude insensitivity, some high-suction-force slider designs do not possess good altitude insensitivity.

Figure 4:
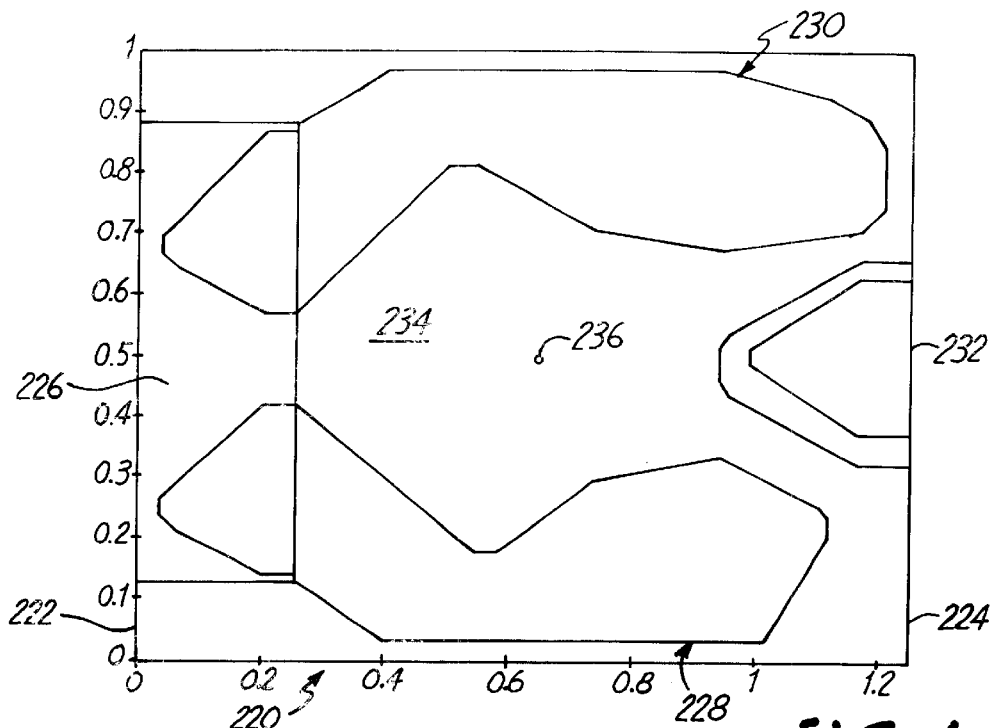
FIG. 4 is a bottom plan view of a typical state-of-the-art slider having a substantial fraction of the subambient pressure cavity located in front of the slider's center of mass.

FIG. 4 is a bottom plan view of a typical state-of-the-art slider 220 having a substantial fraction of the subambient pressure cavity located in front of the slider's center of mass. Slider 220 has a leading slider edge 222, a trailing slider edge 224, a recessed cavity dam 226, first and second side rails 228 and 230, a trailing center pad 232 and a subambient pressure cavity 234. A substantial fraction of subambient pressure cavity 234 is located forward of a center of mass 236 of slider 220. Subambient pressure is generated just behind recessed cavity dam 226, which is located along leading slider edge 222. Therefore, the centroid of subambient pressure is located in front of or near the center of mass 236. Also, subambient pressures is generated largely along the sides of the air bearing surfaces formed by rails 228 and 230. Such a subambient pressure cavity is often advantageous because it gives slider 220 a high stiffness and thus stabilizes the flying height with respect to various perturbations.

Figure 5:
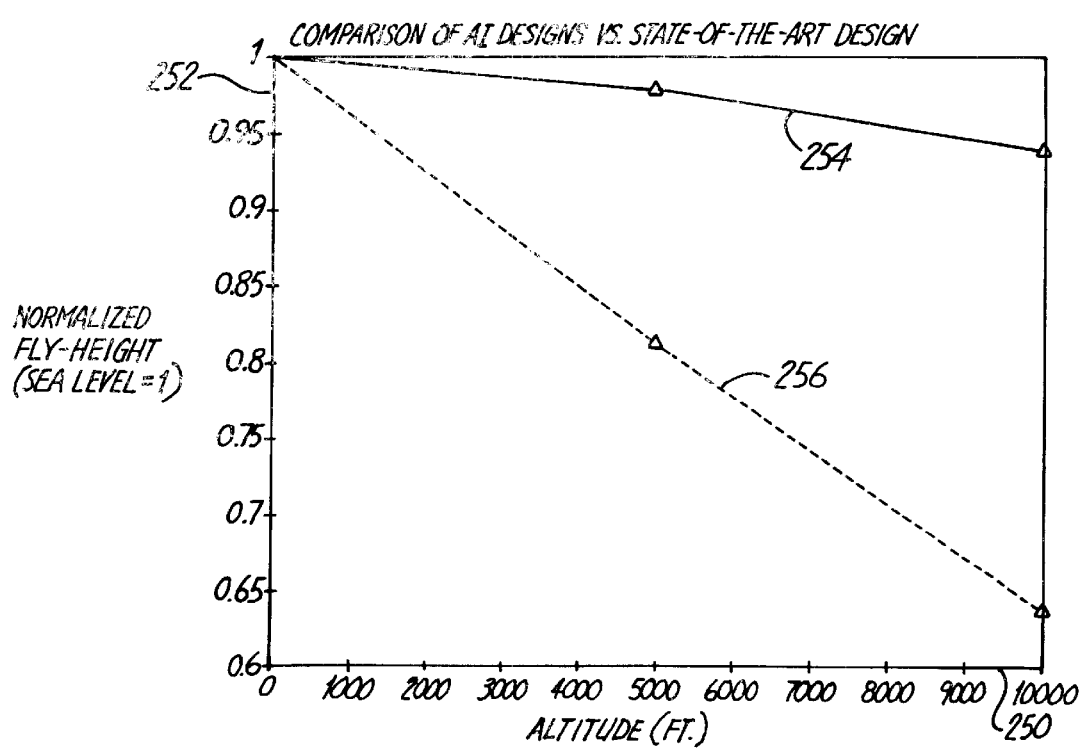
FIG. 5 is a graph illustrating a comparison between flying height sensitivities to altitude for the sliders shown in FIGS. 2 and 4.

FIG. 5 shows the results of a comparison between the flying height sensitivities to changes in altitude for the sliders shown in FIGS. 2 and 4. X-axis 250 represents altitude in feet above sea level. Y-axis 252 represents normalized flying height, which is the actual flying height divided by the flying height at sea level. The flying heights of sliders 110 and 220 were computed at sea level, 5,000 feet and 10,000 feet. Sliders 110 and 220 both had a size of 1.25 mm×1.0 mm and had a nominal sea-level flying height in the 1.1 microinch to 1.5 microinch range.

Line 254 represents the flying height for slider 110, and line 256 represents the flying height for slider 220. The flying height sensitivity to changes in altitude of slider 110 was less than that of slider 220 by a factor of two or more. For a sea-level flying height of 0.4 microinches, slider 110 would experience a flying height drop of only 0.1 microinch for a 10,000 foot change in altitude. The results shown in FIG. 5 corroborate the behavior predicted by the spring model discussed above with respect to FIG. 3.

Figure 6:
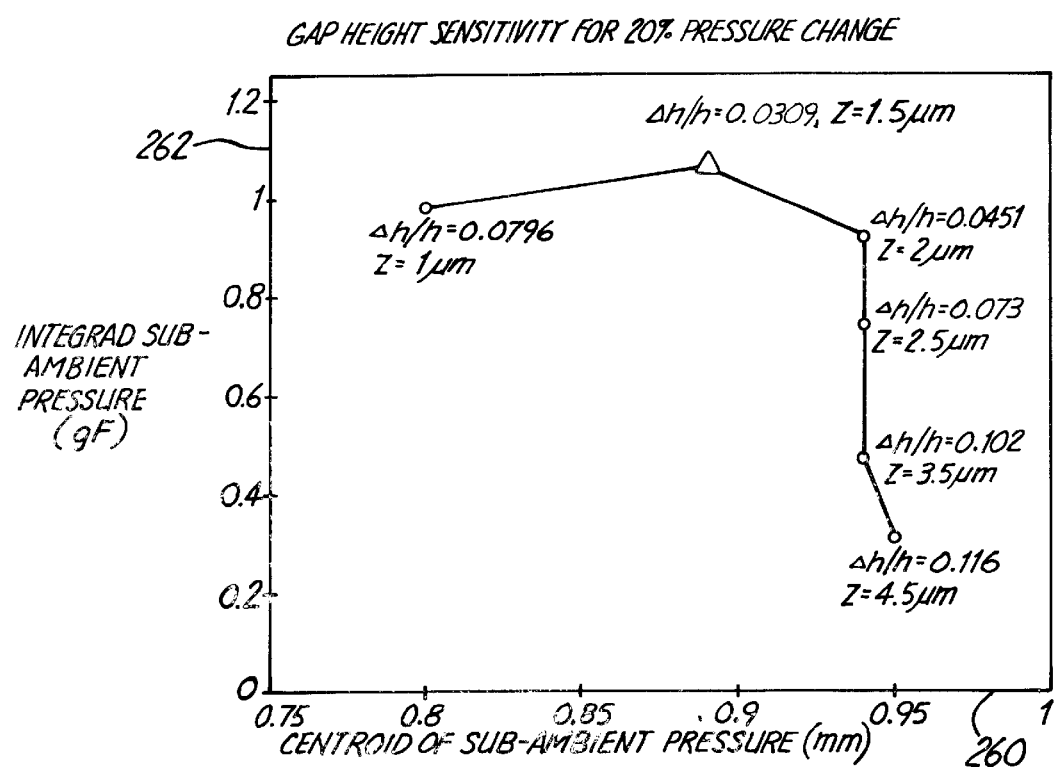
FIG. 6 is a graph illustrating flying height sensitivity of the slider shown in FIG. 2 for a drop in ambient pressure as the depth of subambient pressure cavity was varied.

FIG. 6 is a graph illustrating flying height sensitivity of slider 110 for a 20% pressure change as the depth of subambient pressure cavity 180 was varied from 1 micron to 4.5 microns. X-axis 260 represents the centroid location of subambient pressure (mm) relative to leading slider edge 130. Y-axis 262 represents the integral of subambient pressure (gF) in subambient pressure cavity 180. The variable Z represents the cavity depth, and Δh/h represents the flying height sensitivity.

As the cavity depth Z was varied, the location and the amount of subambient pressure also changed. Each point in the graph is labeled with a cavity depth Z and a corresponding sensitivity to altitude Δh/h, which is shown as the fractional change in flying height given a 20% change in ambient pressure. The point of minimal flying height change occured when the cavity depth was Z=1.5 microns.

By comparing FIG. 6 to FIG. 3, it is clear that the dependence of altitude sensitivity on the location and amount of subambient pressure from the full numerical simulations agrees with the spring model discussed above. Referring to FIG. 6, as the cavity depth was initially decreased, the amount of subambient pressure initially increased rapidly, while the location of the centroid of ambient pressure remained relatively constant. This allowed the altitude sensitivity to decrease. At some point, the amount of subambient pressure saturated, while the centroid location moved forward, which eventually yielded higher altitude sensitivities. For comparison, with a cavity depth of 3 microns, the typical state-of-the-art slider 220 (shown in FIG. 4) had about 1.9 gF of suction force (about twice that of slider 110 shown in FIG. 2) but had a centroid location of x=0.6 mm, which was slightly in front of the slider center of mass at x=0.625 mm.

Thus, the slider of the present invention has its centroid of subambient pressure located rearward, rather than forward, on the slider body. In one embodiment, subambient pressure cavity 180 of slider 110 is adapted to define the centroid of subambient pressure at a location between 0.68 and 0.76 times the length of slider 110. This range corresponds to 0.85 mm to 0.95 mm along X-axis 260 of FIG. 6.

Figure 7:
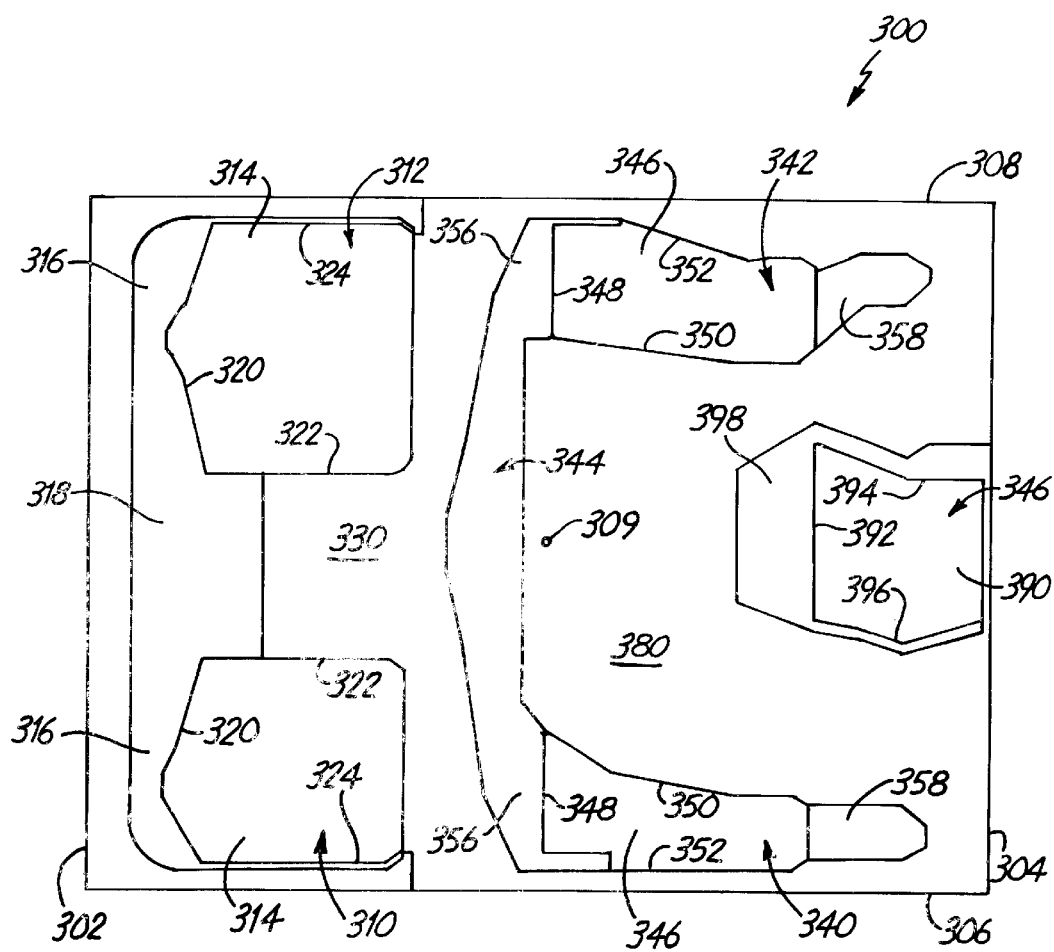
FIG. 7 is a bottom plan view of a slider having forward and rearward subambient pressure cavities, according to an alternative embodiment of the present invention.

FIG. 7 is a bottom plan view of a slider 300 according to an alternative embodiment of the present invention. Slider 300 has a leading slider edge 302, a trailing slider edge 304, side edges 306 and 308 and a center of mass 309. First and second raised rails 310 and 312 are positioned near leading slider edge 302, along side edges 306 and 308, respectively. Each rail 310 and 312 has a bearing surface 314 and a leading step surface 316. Bearing surfaces 314 terminate prior to the slider center of mass 309 and trailing slider edge 304.

A first cavity dam 318 extends along leading slider edge 302, between rails 314 and 316. Cavity dam 318 is coplanar and contiguous with leading step surfaces 316. Cavity dam 318 and leading step surfaces 316 are recessed from bearing surfaces 314 by a step height of 0.05 microns to 1.5 microns, for example. In the embodiment shown in FIG. 7, leading step surfaces 316 wrap around leading edges 320 of bearing surfaces 314, and extend along at least a portion of inside and outside rail edges 322 and 324. Leading step surfaces 316 assist in pressurizing bearing surfaces 314 at various skew angles. In an alternative embodiment, cavity dam 318 can be formed with a leading taper by a traditional grinding or lapping process that is performed before etching the remainder of the bearing features, as is well known in the art.

A first subambient pressure cavity 330 trails first cavity dam 318, between first and second rails 310 and 312, and is forward of the slider's center of mass 309. First subambient pressure cavity 330 is recessed from bearing surfaces 314 by a cavity depth of 1 micron to 4.5 microns, for example. First subambient pressure cavity 330 provides slider 300 with reduced pitch torque sensitivity.

Slider 300 further includes third and fourth raised rails 340 and 342, second cavity dam 344 and trailing center pad 346. Second cavity dam 344 is positioned rearward of first and second rails 310 and 312, just forward of the slider's center of mass 309. Third and fourth rails 340 and 342 extend rearward from second cavity dam 344, and terminate prior to trailing slider edge 304. Third and fourth rails 340 and 342 each have a bearing surface 346 with a leading edge 348, an inside edge 350 and an outside edge 352. Third and fourth rails 340 and 342 each further include a recessed leading step surface 356, which extends along leading bearing edge 348, and a recessed trailing rail surface 358, which trails bearing surfaces 346. Leading step surfaces 356 wrap around leading bearing edges 348 and extend along a portion of outside bearing edges 352. In one embodiment, cavity dam 344, leading step surfaces 356 and trailing rail surfaces 358 are recessed from bearing surfaces 348 of rails 340 and 342 by a step height of 0.05 microns to 1.5 microns, for example. Leading step surfaces 356 improve pressurization of bearing surfaces 346, while trailing rail surfaces 358 provide the trailing corners of slider 300 with greater clearance at high roll angles while keeping the negative pressure pocket as large as possible.

A second subambient pressure cavity 380 trails second cavity dam 344 and is recessed from bearing surfaces 346 by a cavity depth of 1 micron to 4.5 microns, for example. Similar to the embodiment shown in FIG. 2, substantially the entire area of subambient pressure cavity 380 is positioned rearward of slider center of mass 309. As a result, slider 300 has been found to exhibit reduced flying height sensitivity to variations in altitude as compared to slider 220 shown in FIG. 4.

Trailing center pad 346 has a bearing surface 390 with a leading edge 392 and side edges 394 and 396. center pad 346 further includes a leading step surface 398 which is raised from subambient pressure cavity 380 and recessed from bearing surface 390. Leading step surface 398 wraps around leading bearing edge 392 and extends rearward along side edges 394 and 396 to trailing slider edge 304. Leading step surface 398 assists in pressurizing bearing surface 390 along trailing slider edge 304 at various skew angles with respect to air flow.

The slider of the present invention maintains substantially constant magnetic head-media separation despite changes in ambient pressure. This reduces the need for an undesireably high flying height at sea level and significantly reduces the danger of head crashes at high operating altitudes. The slider of the present invention achieves these results by locating the subambient pressure cavity near the trailing edge of the slider such that pitch torque from subambient pressure generated by subambient pressure within the cavity nearly cancels any flying height drop caused by a reduction in pressure along the positive pressure regions of the slider.

Although the present invention has been described with reference to preferred embodiments, workers skilled in the art will recognize that changes may be made in form and detail without departing from the spirit and scope of the invention.

What is claimed is:

1. A self-loading disc head slider comprising:

a slider body comprising leading and trailing slider edges, first and second side edges, and a length along a slider center line, from the leading slider edge to the trailing slider edge;

first and second raised rails positioned on the slider body, generally along the first and second side edges, respectively, and terminating prior to the trailing slider edge, wherein the first and second raised rails form first and second bearing surfaces;

a raised center pad positioned along the trailing slider edge at the slider center line and forming a third bearing surface;

a cavity dam positioned rearward of the first and second raised rails and having a forward section positioned forward of the raised center pad and first and second leg sections extending rearward from the forward section on respective sides of the raised center pad wherein the cavity dam has a generally u-shape which at least partially envelopes the raised center pad; and a subambient pressure cavity, which trails the cavity dam and extends towards respective sides of the raised center pad.

2. The self-loading slider of claim 1 wherein the slider body has a center of gravity and the subambient pressure cavity is located entirely rearward of the center of gravity.

3. The self-loading slider of claim 1 wherein the subambient pressure cavity is adapted to define a centroid of subambient pressure at a location between 0.68 and 0.76 times the length of the slider body.

4. The self-loading slider of claim 3 wherein the subambient pressure cavity has a depth of 1.0 microns to 4.5 microns, as measured from the first, second and third bearing surfaces.

5. The self-loading slider of claim 4 wherein the depth of the subambient pressure cavity is about 1.5 microns.

6. The self-loading slider of claim 1 wherein the cavity dam is raised from the subambient pressure cavity and is recessed from the first, second and third bearing surfaces.

7. The self-loading slider of claim 6 wherein the cavity dam is recessed from the first, second and third bearing surfaces by 0.05 microns to 1.5 microns.

8. The self-loading slider of claim 6 wherein the first and second raised rails further comprise first and second leading step surfaces, respectively, which are positioned along leading edges of the first and second bearing surfaces and are recessed from the first and second bearing surfaces by 0.05 microns to 1.5 microns.

9. The self-loading slider of claim 1 wherein:

the raised center pad extends from a trailing edge of the forward section of the cavity dam to the trailing slider edge and divides the subambient pressure cavity into first and second cavity portions.

10. The self-loading slider of claim 1 wherein the first and second leg sections of the cavity dam intersect the first and second side edges of the slider body and terminate prior to the trailing slider edge.

11. The self-loading slider of claim 1 wherein the first and second leg sections of the cavity dam terminate prior to the trailing slider edge.

12. The self-loading slider of claim 1 and further comprising a further cavity dam extending along the leading slider edge, between the first and second raised rails, and a further subambient pressure cavity, which trails the further cavity dam, between the first and second raised rails.

13. A self-loading disc head slider comprising:

a slider body comprising leading and trailing slider edges and first and second side edges;

first and second raised rails positioned on the slider body, generally along the first and second side edges, respectively, and terminating prior to the trailing slider edge;

a first cavity dam extending along the leading slider edge, between the first and second raised rails;

a first subambient pressure cavity, which trails the first cavity dam, between the first and second raised rails;

a second cavity dam positioned rearward of the first and second raised rails;

third and fourth raised rails extending rearward from the second cavity dam, generally along the first and second side edges, respectively, and terminating prior to the trailing slider edge;

a second subambient pressure cavity, which trails the second cavity dam; and a raised center pad positioned along the trailing slider edge between the third and fourth raised rails.

14. The self-loading slider of claim 13 wherein:

the first, second, third, fourth raised rails and the raised center pad form first, second, third, fourth and fifth bearing surfaces respectively, with each bearing surface having a leading bearing edge;

the first, second, third, fourth raised rails and the raised center pad each comprise a leading step surface along the respective leading bearing edge, which is raised from the first and second subambient pressure cavities and is recessed from the respective bearing surface;

the leading step surfaces of the first and second raised rails are coplanar and contiguous with the first cavity dam; and the leading step surfaces of the second and third raised rails are coplanar and contiguous with the second cavity dam.

15. The self-loading slider of claim 14 wherein:

the first, second, third and fourth raised rails each further comprise inside and outside rail edges and the raised center pad has first and second side edges;

the leading step surfaces of the first and second raised rails wrap around the respective leading bearing edges and extend rearward along a portion of the inside and outside rail edges of the first and second raised rails;

the leading step surfaces of the third and fourth raised rails wrap around the respective leading bearing edges and extend rearward along a portion of the outside rail edges of the third and fourth raised rails; and the leading step surface of the raised center rail wraps around the respective leading bearing edge and extends rearward along a portion of the first and second side edges of the raised center rail.

16. The self-loading slider of claim 15 wherein the third and fourth raised rails further comprise trailing rail surfaces, which trail the bearing surfaces of the third and fourth rails and are coplanar with the leading step surfaces.

* * * * *

UNITED STATES PATENT AND TRADEMARK OFFICE
CERTIFICATE OF CORRECTION

PATENT NO. : 6,459,546 B1
DATED : October 1, 2002
INVENTOR(S) : Mundt et al.

It is certified that error appears in the above-identified patent and that said Letters Patent is hereby corrected as shown below:

<u>Column 10,</u>
Line 17, after "surfaces" insert -- , --.

Signed and Sealed this

Twenty-fifth Day of March, 2003

JAMES E. ROGAN
*Director of the United States Patent and Trademark Office*